(12) United States Patent
Roberts

(10) Patent No.: US 6,483,617 B1
(45) Date of Patent: Nov. 19, 2002

(54) MONITORING OF NONLINEAR EFFECTS

(75) Inventor: Kim Byron Roberts, Nepean (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/637,553

(22) Filed: Aug. 11, 2000

Related U.S. Application Data

(63) Continuation of application No. 08/769,986, filed on Dec. 19, 1996, now Pat. No. 6,128,111.

(51) Int. Cl.[7] .............................................. H04B 10/08
(52) U.S. Cl. ........................ 359/110; 359/161; 359/177
(58) Field of Search ................................ 359/110, 124, 359/161, 173, 177

(56) References Cited

U.S. PATENT DOCUMENTS

| | | | |
|---|---|---|---|
| 4,947,459 A | | 8/1990 | Nelson ........................ 455/612 |
| 5,410,624 A | | 4/1995 | Morkel ......................... 385/24 |
| 5,513,029 A | * | 4/1996 | Roberts ....................... 359/177 |
| 5,654,816 A | * | 8/1997 | Fishman ...................... 359/177 |
| 6,023,366 A | * | 2/2000 | Kinoshita .................... 359/177 |
| 6,229,631 B1 | * | 5/2001 | Sato et al. ................... 359/110 |

OTHER PUBLICATIONS

Buhrgard, "Competition Between Four–Wave Mixing and Stimulated Brillouin Scattering at 1.3 μm CW in a Single–Mode Fibre", ECOC Proceedings, Conf. 15, Sep. 10, 1989, pp. 154–157.

* cited by examiner

*Primary Examiner*—Kinfe-Michael Negash
(74) *Attorney, Agent, or Firm*—Lee, Mann, Smith, McWilliams, Sweeney & Ohlson

(57) ABSTRACT

An optical transmission system comprises a number of optical terminals connected by optical waveguides such as optical fibers. Nonlinear processes occurring within an optical transmission medium of the waveguide or within the optical terminals is detected by a monitor which outputs monitored data representative of the products of nonlinearity. The data is used to control the power of the optical signal such that power is regulated to avoid the onset of the nonlinear process. The data may also be used to indicate an alarm condition to an operator. A monitor for four wave mixing detection utilizes dither signals applied to respective frequency components of a wavelength division multiplexed signal, products of the four wave mixing process being detected in the monitor by correlation between a sample of a received optical signal and reference data representative of dither induced modulation in the four wave mixing product. Mutually orthogonal dither wave forms are derived from pseudo-random sequences and applied as low frequency modulations to transmitted optical signals. Such monitors allow optical power to be controlled and assist in locating defective equipment requiring remedial action. The invention has application to long haul optical transmission systems.

13 Claims, 6 Drawing Sheets

MONITORING OF NONLINEAR EFFECTS

RELATED APPLICATION

This application is a continuation of U.S. patent application Ser. No. 08/769,986 filed Dec. 19, 1996, now U.S. Pat. No 6,128,111. This application discloses and claims only subject matter disclosed in the prior application whose particulars are set out above and the Inventor in this application is the same.

FIELD OF THE INVENTION

This invention relates to methods and apparatus for transmitting optical signals in an optical transmission system with optimum power while avoiding degradation of the optical signal due to nonlinear processes occurring in an optical transmission medium constituting a component of the optical transmission system.

BACKGROUND OF THE INVENTION

It is generally desirable in optical transmission systems for optical signals to be transmitted via optical waveguides of the system at high power levels in order to maintain sufficient signal to noise ratios over extended transmission distances such that an acceptably low level of bit error rate is present in the received optical signal. Optical waveguides such as optical fibres however comprise an optical transmission medium which exhibits nonlinear effects at high power levels, resulting in degradation of the optical signal. Nonlinear effects may similarly occur within optical terminals of the system in optical transmission media of components such as optical amplifiers. The optimum power level at which optical signals could be transmitted is typically the maximum power level at which significant degradation due to nonlinearity is avoided. Since the performance of various optical components within the system having respective optical transmission media will vary with operating conditions and age or component replacement, a safety margin is allowed in setting the maximum power level when designating the system. Consequently, it is typically the case that optical transmission systems will operate at power levels which are less than the optimum power level.

A further problem is that an individual optical component forming part of the optical transmission system may suffer a sudden or gradual loss of performance but without total failure such that unacceptable degradation of system performance characterised by the presence of the products of a nonlinear process occurs. Often it may then be difficult to locate the faulty component.

Of particular concern in considering nonlinear processes are the effects of four wave mixing, particularly in relation to WDM (wavelength division multiplexed) optical transmission systems having a number of frequency channels separated by a substantially uniform frequency channel spacing such that each frequency channel may potentially become corrupted with the product of four wave mixing associated with respective pairs of other frequency channels.

In the example shown in FIG. 2(a), four channels having frequencies $\omega_1$, $\omega_2$, $\omega_3$ and $\omega_4$ are transmitted with equal power.

Considering photon interactions between the $\omega_2$ and $\omega_3$ channels only, the four wave mixing process may take the form $$\omega_1 = 2\omega_2 - \omega_3 = \omega_2 - \Delta\omega \qquad \text{Equation 1;}$$

or $$\omega_4 = 2\omega_3 - \omega_2 = \omega_3 + \Delta\omega \qquad \text{Equation 2;}$$

where $\Delta\omega$ is the frequency separation between channels.

The products of four wave mixing between photons in channels $\omega_2$ and $\omega_3$ therefore occur at frequencies $\omega_1$ and $\omega_4$ as illustrated in FIG. 2(b), resulting in a loss of power from the channels $\omega_2$ and $\omega_3$ and interference in the wavelength bands around $\omega_1$ and $\omega_4$.

For an analysis of nonlinear processes the reader is referred to "Nonlinear Fiber Optics", Second Edition, Govind P. Agrawal, 1995 and in particular to Chapter 10 which deals with four-wave mixing. Problems associated with four-wave mixing are discussed in U.S. Pat. No. 5,410,624 which proposes using dissimilar wavelength channel spacings to avoid interference. The onset of nonlinearity with increasing levels of optical power is discussed in U.S. Pat. No. 5,420,868 which proposes amplitude and phase modulation of components of an optical beam to suppress Stimulated Brillouin Scattering. The cumulative effect of all degradations in a system can be determined by eye measurements as described in U.S. Pat. No. 4,823,360. The individual sources of degradation cannot however by distinguished.

It is known from U.S. Pat. No. 5,512,029 to modulate the optical signals such that each single wavelength channel is modulated with a high speed data stream and a respective low speed, small amplitude dither signal. The dither signals are mutually orthogonal pseudo-random sequences which can be reliably identified by digital correlation techniques in a performance monitoring apparatus. By monitoring a received optical signal, the performance of components of an optical transmission system in terms of the effects of random noise processes is measured by comparing the modulation depth in the decoded dither signal with the known modulation depth of the transmitted dither signal. Defects in components of the system may thereby be detected by observing changes in signal to noise measurements obtained by monitoring the dither modulation depth.

This technique however does not provide any specific sensitivity to the products of nonlinear processes. Furthermore, none of the above references provide a satisfactory technique for monitoring and controlling nonlinear processes within an optical transmission system.

SUMMARY OF THE INVENTION

It is an object of the present invention to provide apparatus and method for monitoring optical signals in an optical transmission system to detect degradation of the optical signal due to nonlinear processes.

It is a further object of the present invention to provide a method of controlling the optical power of an optical signal so as to avoid the onset of nonlinear processes.

According to the present invention there is disclosed an optical transmission system comprising;

a plurality of optical terminals;

optical waveguide means interconnecting the optical terminals and operable to conduct optical signals therebetween; and at least one of the waveguide means and the optical terminals comprising an optical transmission medium susceptible to a nonlinear process at high power levels of the optical signal;

wherein at least one optical terminal comprises monitoring means operable to monitor degradation of the optical signals consistent with the nonlinear process occurring in the optical transmission medium and to output monitored data representative of such degradation.

In the context of the present invention, the term optical terminal is to be understood to include transmitters, receivers, repeaters or other processing elements to which the waveguide means are connected, and in particular including elements of the system which comprise optical amplifiers.

Preferably the optical terminal comprises an alarm indicating means responsive to the monitored data and operable to provide an alarm indication indicative of such degradation being detected.

It is thereby possible to provide the system with one or more alarms which will alert an operator to the need to undertake investigative or remedial action, possibly be replacing a component containing the optical transmission medium upstream of the monitoring means.

The alarm indicating means may provide a remote or local alarm.

The monitored data may also be input to a control means operable to control the power level of the optical signal. When nonlinear processes are detected, the power level may be reduced until the monitored data no longer indicates the presence of products of the nonlinear process. The integrity of the transmitted data may therefore be maintained, subject to the effects of operating at a reduced power level.

Preferably the monitoring means is operable to detect products of four wave mixing. Where the optical signals are wavelength division multiplexed with a plurality of single frequency channels separated by a substantially uniform frequency channel spacing, the monitoring means may be operable to detect products of four wave mixing in at least one of the single frequency channels.

Since prevailing data transmission standards typically require substantially uniform frequency channel spacing, a particular problem is that the products of four wave mixing cause interference and cross-talk in adjacent frequency channels. The monitoring of such processes to provide an alarm or power control feedback therefore provides significant advantages in preserving the integrity of the transmitted data and channel separation.

According to a preferred embodiment, an optical transmission system comprises signal modulating means operable to modulate the single frequency channels with respective high speed data streams and dither modulation means operable to modulate the single frequency channels with respective low speed, small amplitude dither signals.

An advantage of such dither modulation is to provide each of the transmitted frequency channels with a marker which can be identified by a correlation process in the received optical signals in the event of there being cross-talk or cross-channel interference resulting from four wave mixing.

Preferably the monitoring means comprises sampling means operable to detect an optical signal sample of the optical signal after having been transmitted through the optical transmission medium and further comprising a processor operable to perform a correlation between the optical signal sample and reference data representative of dither induced modulation in the four wave mixing product to obtain a correlation value constituting said monitored data.

Preferably the reference data comprises at least one spectral template derived from a predetermined pseudo-random sequence encoded in a respective dither signal.

According to a further aspect of the present invention there is disclosed a method of controlling the optical power of an optical signal in an optical transmission system; the method comprising the steps of;

conducting an optical signal in an optical transmission medium susceptible to a nonlinear process at high power levels of the optical signal;

determining the optical power of the optical signal by action of a variable gain device;

monitoring the optical signal by operation of a monitoring means so as to detect degradation of the optical signal consistent with a nonlinear process occurring in the optical transmission medium;

outputting monitored data from the monitoring means representative of such degradation; and controlling the variable gain device by operation of a control means responsive to the monitored data such that the level of degradation as indicated by the monitored data remains within a predetermined limit.

According to a further aspect of the present invention there is disclosed monitoring apparatus for use in an optical transmission system comprising sampling means operable to sample a received optical signal to provide sampled data, a processor operable to correlate the sample data with reference data representative of a product of a four wave mixing process being present in the received optical signal; and means for outputting monitored data representative of the detection of products of the four wave mixing process.

BRIEF DESCRIPTION OF THE DRAWINGS

Embodiments of the present invention will now be described by way of example only and with reference to the accompanying drawings of which;

FIG. 1 shows schematically an optical transmission system 1 having a first optical terminal 2 connected to a second optical terminal 3 by an optical waveguide 4 in the form of a single mode optical fibre. The optical waveguide 4 conducts optical signals 5 through an optical transmission medium 6 in the form of doped silica.

Figure 2A:
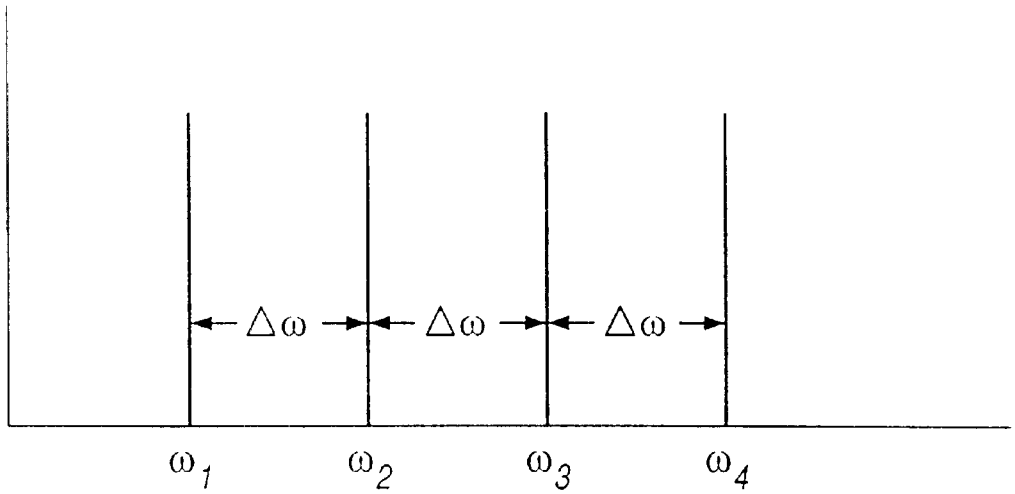
FIG. 2 is a schematic representation at 2(a) of the spectrum of a four channel WDM signal and at 2(b) the effects of four wave mixing on components $\omega_2$ and $\omega_3$ of the signal.

The first optical terminal 2 includes a multiplexer 7 which combines single frequency components 8, 9, 10 and 11 to form the optical signal 5, the single frequency components having respective frequencies $\omega_1$, $\omega_2$, $\omega_3$, $\omega_4$ which are separated by a substantially uniform frequency spacing $\Delta\omega$ as shown in FIG. 2(a). The amplitudes of the single frequency components 8 to 11 are controlled by variable gain transmitter components 12, 13, 14 and 15 respectively under the control of a controller 16. Each of the variable gain transmitter components 12 to 15 comprises a source modulated to carry ten Gbits per second at 10 mwatts according to OC-192 standard digital transmission hierarchy.

The second optical terminal 3 comprises a receiver 17 for receiving the optical signal 5 and a monitor 18 operable to detect and quantify the presence in the received optical signal 5 of degradation of the optical signal consistent with a nonlinear process having occurred in the optical transmission medium 6. An example of how such a monitor 18 may function in respect of detecting a specific nonlinearity in the form of four wave mixing will be described below with reference to FIGS. 3 to 6.

The monitor 18 provides monitored data 19 which is communicated to the controller 16, by being encoded into overhead bits of a further optical signal (not shown) transmitted from the second optical terminal 3 to the first optical terminal 2.

The monitor 18 is also connected to a local alarm indicator 20 for indicating to an operator an alarm indication in response to the detection of the products of a nonlinear process in the received optical signal 5 in excess of a predetermined threshold.

The monitored data 19 is also communicated to a remote alarm indicator 21 which in the present example is located at the first optical terminal 2. The remote alarm indicator 21 is similarly operable to provide to an operator an alarm indication in response to the detection of the products of a nonlinear process in the received optical signal 5 in excess of the predetermined threshold.

The controller 16 consists of a micro-controller programmed to reduce the gain of variable gain transmitter components 12 to 15 in the event that signal degradation due to nonlinearity is detected by the monitor 18, thereby reducing the launched power level of the optical signal 5 until the products of the nonlinear process are no longer detected or are within an acceptable tolerance set by the predetermined threshold. The optical transmission system 1 may thereby be operated at a power level which exceeds its nominal design specification and may achieve operation at its optimum power level since, if the optimum power level is exceeded, the onset of nonlinear processes will be detected and the power reduced.

Figure 3:
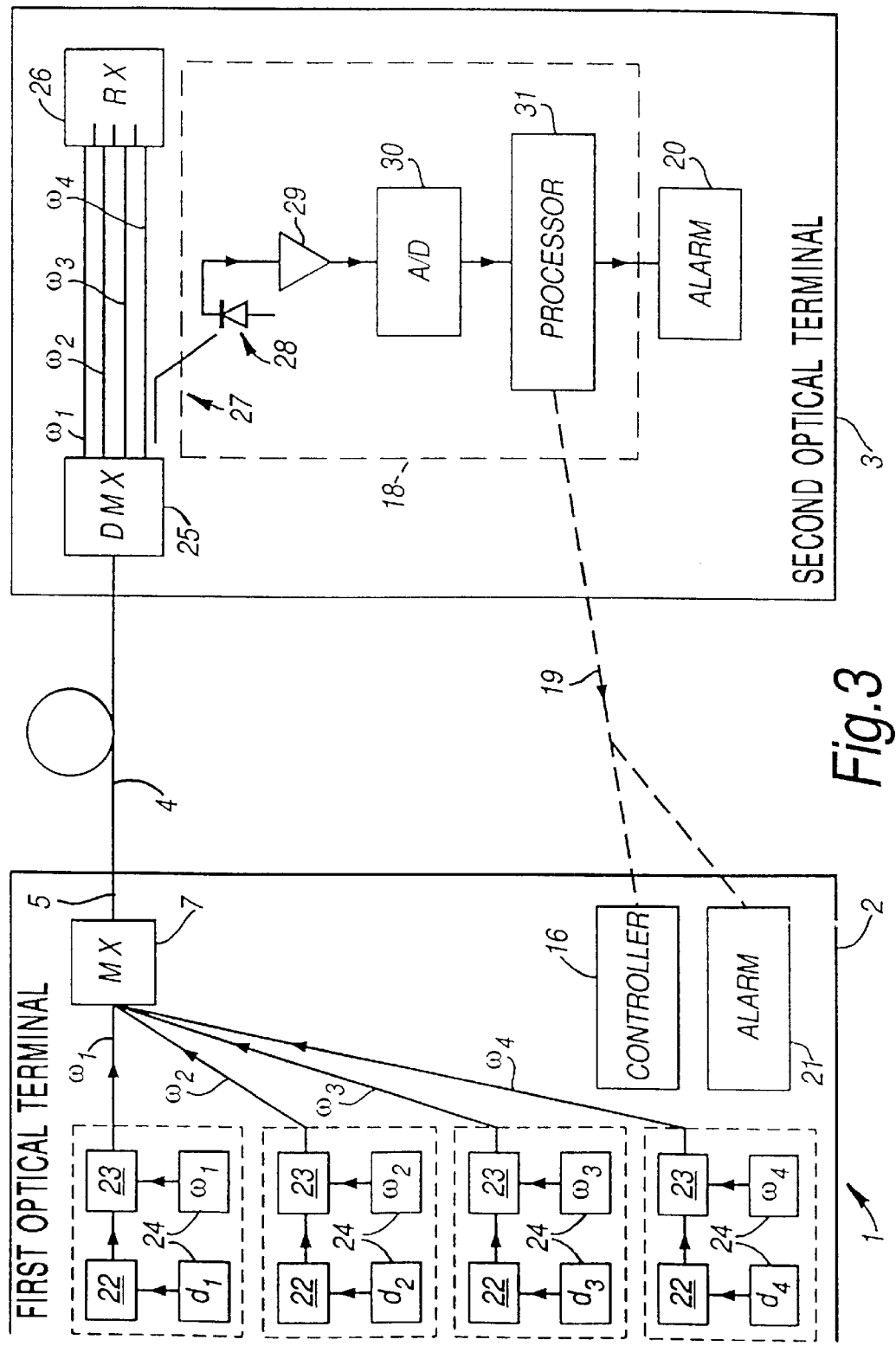
FIG. 3 is a schematic diagram of an optical transmission system having four frequency channels and dither modulation means for applying small amplitude dither signals to each channel.

The monitoring of a specific nonlinear process in the form of four wave mixing is now described with reference to FIG. 3 using corresponding reference numerals of preceding Figures where appropriate. In FIG. 3, an optical transmission system 1 comprises first and second optical terminals 2 and 3 connected by an optical waveguide 4 for the transmission of a WDM optical signal 5 comprising frequency channels $\omega_1$, $\omega_2$, $\omega_3$, and $\omega_4$ with substantially uniform frequency separation $\Delta\omega$.

The first optical terminal 2 comprises transmitters 12, 13, 14 and 15 for providing the channels $\omega_1$, $\omega_2$, $\omega_3$, and $\omega_4$ respectively, each transmitter being constituted by a respective optical source 22 in the form of a semi-conductor laser, a respective optical modulator 23 for modulating the output of the source and respective line encoders 24 providing appropriate electric signals to the modulator to achieve high speed data modulation and electric signals to modulate operation of the source 22 to provide low speed dither modulation.

The line encoders 24 apply dithers having wave forms $d_1$, $d_2$, $d_3$ and $d_4$ respectively which modulate the signal amplitude of channels $\omega_1$, $\omega_2$, $\omega_3$, and $\omega_4$ with a modulation depth of 0.6%. As known from U.S. Pat. No. 5,513,029, such dither also has the beneficial effect of suppressing nonlinear effects such as Stimulated Brillouin Scattering.

The dither wave forms $d_1$, $d_2$, $d_3$ and $d_4$ are mutually distinct wave forms composed of smoothed triangular pulses in a pseudo-random sequence, each sequence being a 64 bit Miller encoded pseudo-random sequence stored in a 128 bit sequence and read repeatedly from memory so as to continuously apply dither to the optical signals. The respective dithers are selected to be mutually orthogonal and orthogonal to the signal data so that the pseudo-random sequences can be reliably identified by digital correlation techniques. In this way, any interference or cross talk due to photons from one channel crossing into another channel can be detected since the dither applied to each channel acts as a marker which will be superimposed as an amplitude modulation in all channels to which the photons contribute interference. In the present context, orthogonality of waveforms is achieved if there is no overlap between the Fourier transforms of the waveform. This can be achieved, for example, where two waveforms have no spectral components in common. The dither waveforms in the present example have a bandwidth of 10 to 100 KHz.

After combining the channels in multiplexer 7, optical signal 5 is transmitted via the optical transmission medium 6 of the optical waveguide 4 to the second optical terminal 3 where the channels are demultiplexed in demultiplexer 25 before being received in receivers 26. The second optical terminal 3 contains a monitor 18 which is shown schematically in the context of monitoring the products of four wave mixing at frequency $\omega_4$ from the channels $\omega_2$, $\omega_3$. It is to be understood, however, that monitoring of each of the channels is in practice undertaken in order to detect four wave mixing products from each available combination of channel frequencies.

An optical tap 27 extracts a sample of channel $\omega_4$ and directs the sample to an opto-electronic conversion device in the form of a PIN diode 28, the current output of which is converted to a voltage signal by means of a transconductance amplifier 29. The output of the transconductance amplifier 29 is converted to digital form by an analogue to digital converter 30 and input to a processor 31. The processor 31 is that processor which performs overall control functions of the second optical terminal 3 and it is therefore envisaged that the processing of the optical tap output is undertaken as an additional software task of the existing processor 31.

Figure 4:
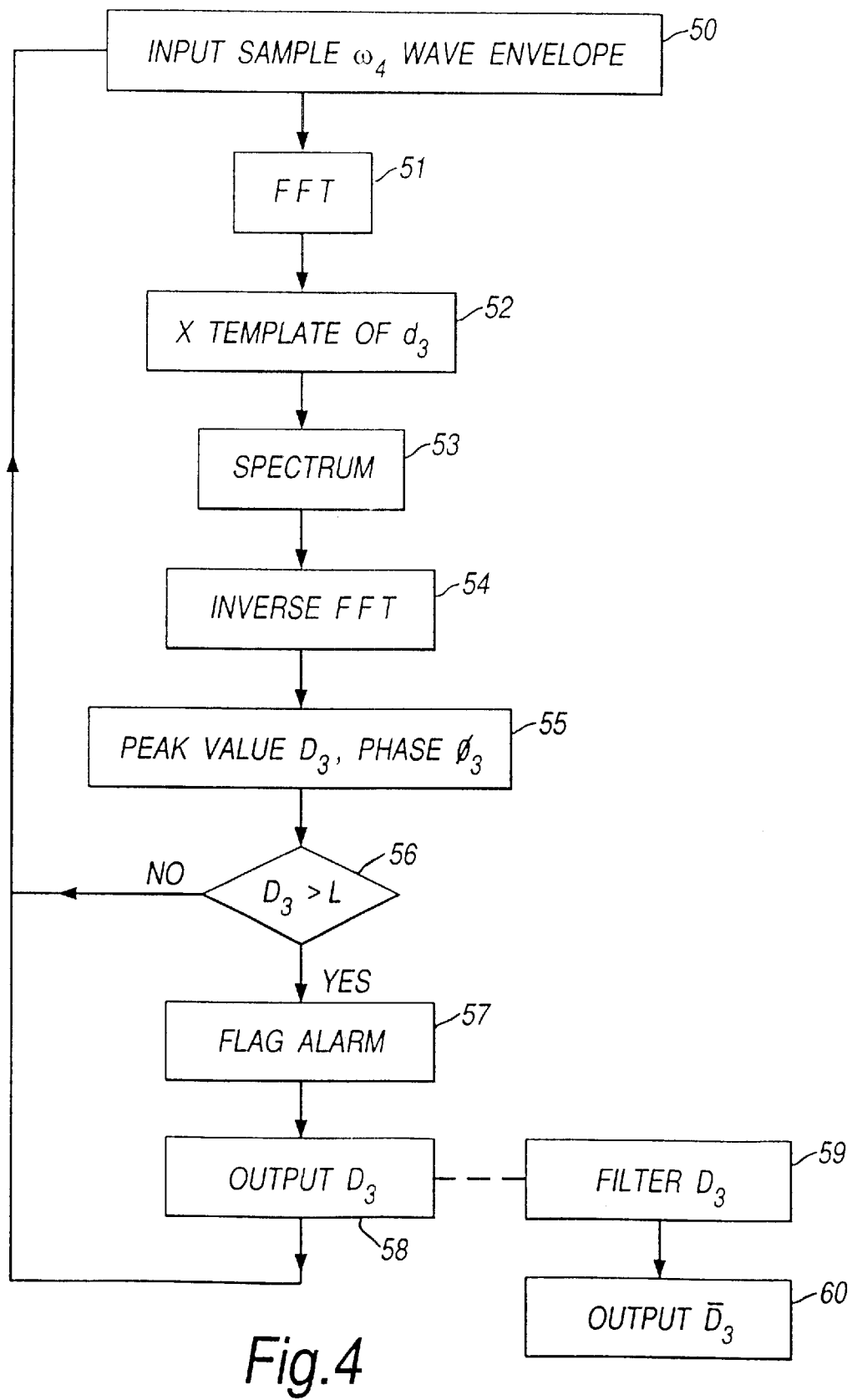
FIG. 4 is a schematic flow chart illustrating the operation of the processor of the system shown in FIG. 3.

The manner in which the processor 31 analyses the $\omega_4$ sample is illustrated in FIG. 4 in the form of a schematic flow chart of the software utilised. The $\omega_4$ sample wave form is input at step 50, the sample being that of the envelope of the received optical signal $\omega_4$ channel, limited in bandwidth by the PIN diode circuit 28 to the bandwidth of the dither signals. A fast Fourier transform is then performed on the sample at step 51 in readiness to perform a digital correlation with a selected dither wave form. Taking as an example the four wave mixing process of Equation 2, the presence of the four wave mixing product in the sample $\omega_4$ envelope will be characterised by an amplitude modulation which can be described as a polynomial of $d_2$ and $d_3$ of which the first order term $P_4^{(1)}$ is given by Equation 3;

$$P_4^{(1)} = 2d_3 - d_2 \qquad \text{Equation 3;}$$

In general, however, the relative phase of $d_2$ and $d_3$ will not be known at the processor 31 so that a correlation with either $d_3$ or $d_2$ will suffice to detect $P_4^{(1)}$, the product of four wave mixing from channels $\omega_3$ and $\omega_2$. In this example, we take the case of correlation to detect $d_3$.

The digital correlation technique used in the processor 31 relies on reference data in the form of a spectral template calculated for the pseudo-random sequence assigned to $d_3$.

The template is calculated by performing a fast Fourier transform on the sequence and deriving the complex conjugate of the resulting discrete Fourier spectrum. The resulting data is collapsed for storage by eliminating data which is not required because the original sequence is real valued and eliminating zero values which add no further information to the spectral template. This reference data is made available to the processor 31 as predetermined reference data.

As indicated in FIG. 4, the fast Fourier transform of the $\omega_4$ sample is multiplied by the $d_3$ spectral template at step 52 to derive a spectrum 53 revealing the correlation between $d_3$ and the $\omega_4$ sample.

The spectrum 53 is then converted to the time domain by an inverse fast Fourier transform at step 54 to obtain a time domain output characterised by a peak value $D_3$ and phase angle $\phi_3$ which are respectively representative of the extent to which correlation reveals the presence of $d_3$ and the detected phase angle of the dither $d_3$ in the $\omega_4$ channel.

The peak value $D_3$ is quantified at step 55 and compared with a threshold level L at step 56 and, if the threshold level L is exceeded, an alarm indication 57 is flagged such that the processor 31 outputs an alarm indication to the alarm indicator 20 for the attention of an operator. The peak value $D_3$ is also made available as an output of the processor 31 and is transmitted to the controller 16.

The sampling process is repeated from step 50 thereby producing a series of output values D3. The processor may include the additional step of processing the output values $D_3$ in a digital filter 59 before finally providing an output to the controller 16 at step 60, the quantitative accuracy of the output value $\overline{D}_3$ thereby being enhanced.

The output value $\overline{D}_3$ may be utilised by the controller 16 to reduce the signal power of channel $\omega_3$ by varying the gain of the $\omega_3$ channel source 22 or by means of the $\omega_3$ source optical modulator 23 under the control of the $\omega_3$ channel line encoder 24. The power of channel $\omega_3$ may thereby be reduced until the output value $D_3$ reduces to below the threshold level L, it then being indicated by the monitor 18 that the four wave mixing nonlinearity resulting in interference in channel 4 is reduced to within acceptable limits specification. The alarm indication generated during the above process identifies the occurrence of a nonlinear process in the optical transmission medium 6 which may, after scrutiny by an operator, require remedial action such as, for example, the replacement of an optical waveguide 4. In a complex optical transmission system including numerous optical terminals, the inclusion of a monitor 18 in each receiving terminal enables the sources of nonlinearity to be readily located, as for example in the case of a long haul transmission with a number of repeating optical terminals.

A further embodiment will now be described using corresponding reference numerals to those of preceding Figures where appropriate for corresponding elements. The further embodiment relates to an optical transmission system 1 shown in FIG. 5 in which an optical signal 5 transmitted from a first optical terminal 2 to a second optical terminal 3 is amplified by an optical amplifier 32 for re-transmission without a demultiplexing stage. An optical tap 27 and PIN diode 28 provide a sample envelope of the multiplexed optical signal which is processed via a transconductance amplifier 29 and analogue to digital converter 30 to provide an input to a processor 31. The location of the optical tap 27 is downstream of both the optical fibre 4 and the optical amplifier 32, each of which comprises a respective optical transmission medium susceptible to nonlinear processes at high levels of optical signal power.

Since the multiplexed signal sample will always correlate with each of the dither waveforms $d_1$, $d_2$, $d_3$ and $d_4$, a different strategy must be adopted in the processor 31 to identify the effects of four wave mixing. It can be shown that the component of power corresponding to the product of four wave mixing at frequency $\omega_4$ resulting from the process of Equation 2 can be expressed as a polynomial in terms of $d_2$ and $d_3$ in which a second order term $P_4^{(2)}$ is given by Equation 4;

$$P_4^{(2)} = 2d_2 d_3 + (d_3)^2 \qquad \text{Equation 4;}$$

The presence of four wave mixing product by this process can therefore be detected by a correlation between this second order term $P_4^{(2)}$ and the multiplexed signal sample. However, in order to form a template for $P_4^{(2)}$ it is necessary to determine the relative phase $\phi_3 - \phi_2$ between the received dither signals $d_3$ and $d_2$ so that the expression given in Equation 4 can then be calculated and the template formed by taking the complex conjugate of the Fourier transform of the combined waveform. To determine $\phi_2$ and $\phi_3$, the procedure of steps 51 to 55 of FIG. 4 is followed in respect of $d_3$ and $d_2$ respectively.

Figure 6:
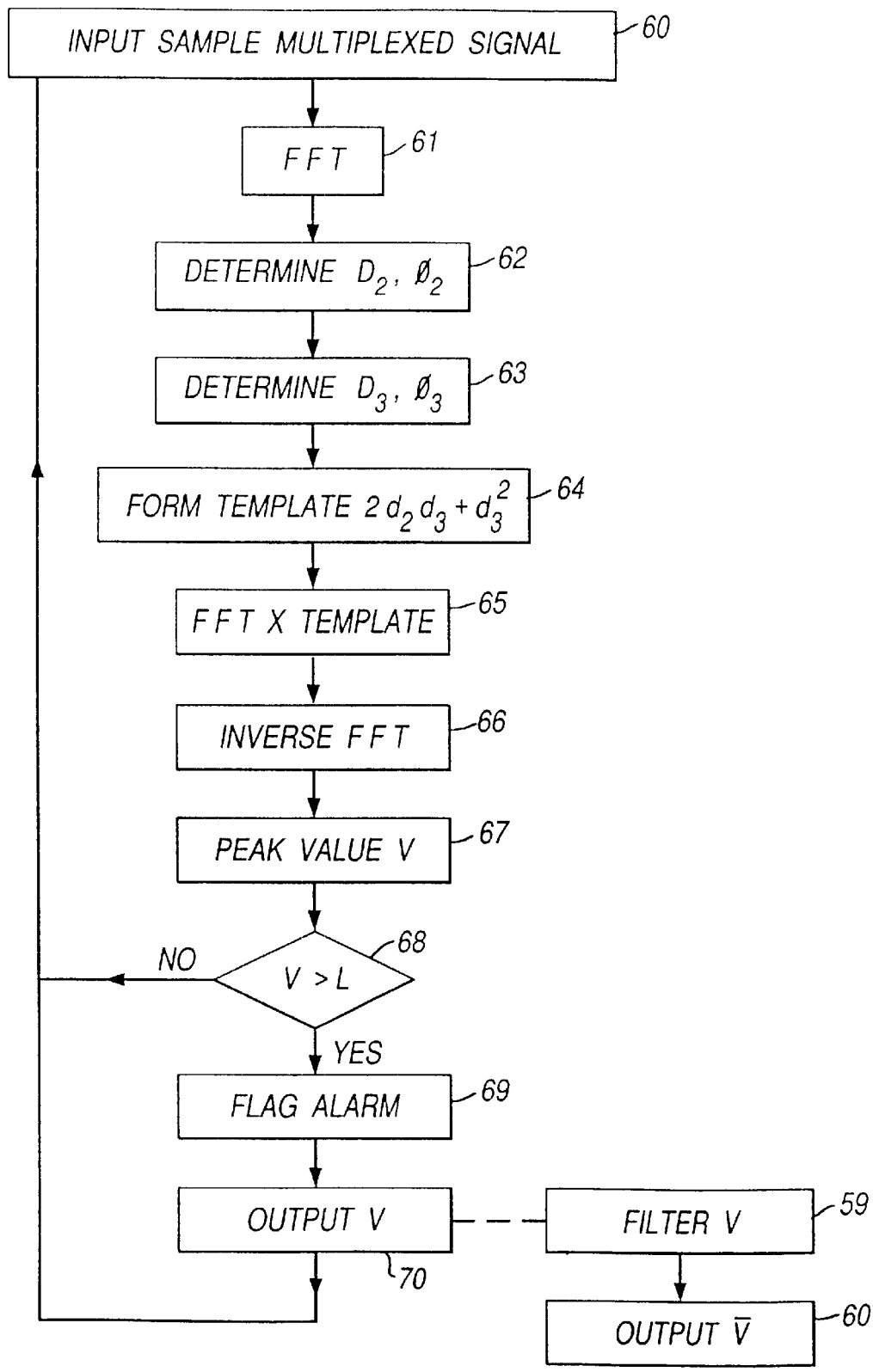
FIG. 6 is a schematic flow chart illustrating the operation of the processor of the system of FIG. 5.

The resulting spectral template for $P_4^{(2)}$ is then utilised in the processor 31 as outlined in the schematic flow chart of FIG. 6.

In FIG. 6, the multiplexed signal is sampled and input to the processor at step 60 and a fast Fourier transform of the sample performed at step 61. A correlation procedure corresponding to steps 52 to 55 described above with reference to FIG. 4 is then conducted in respect of the received dither signal $d_2$ using a spectral template for $d_2$ in order to determine $D_2$ and $\phi_2$, the amplitude and phase outputs of the correlation step. Similarly at step 63, $D_3$ and $\phi_3$ are determined in respect of the received $d_3$ dither signal.

At step 64, the values of $\phi_2$ and $\phi_3$ are used to determine the second order term of Equation 4 and to form a spectral template accordingly. At step 65, the template produced in step 64 is multiplied by the fast Fourier transform produced in step 61 to provide an output spectrum of which an inverse fast Fourier transform is formed at step 66, resulting in a time domain output giving a peak value V which is quantified in step 67.

The peak value V is a measure of correlation between the second order term of $P_4^{(2)}$ Equation 4 and the multiplexed signal sample of step 60. In the absence of four wave mixing between channels $\omega_2$ and $\omega_3$, V would have a zero value. In the presence of such four wave mixing as defined in Equation 2, however, V will have a finite value which is tested against a threshold level L in step 68. If the threshold L is exceeded, an alarm indication is flagged at step 69 and the value of V output to the controller 16 at step 70. The output value of V may be processed by an appropriate digital filter 59 and the filtered value $\overline{V}$ communicated to controller 16 at step 60.

As indicated above in accordance with the method described with reference to FIGS. 3 and 4, the process of FIGS. 5 and 6 will in practice be repeated for each of the possible four wave mixing processes i.e. to detect interference in each of the signal components $\omega_1$, $\omega_2$, $\omega_3$ and $\omega_4$. By feed back to the first optical terminal 2, appropriate correction by gain adjustment can be made to reduce the power of the appropriate frequency component in order to avoid four wave mixing. An alarm indication similarly may be used to alert an operator to the possible need for remedial action.

Figure 1:
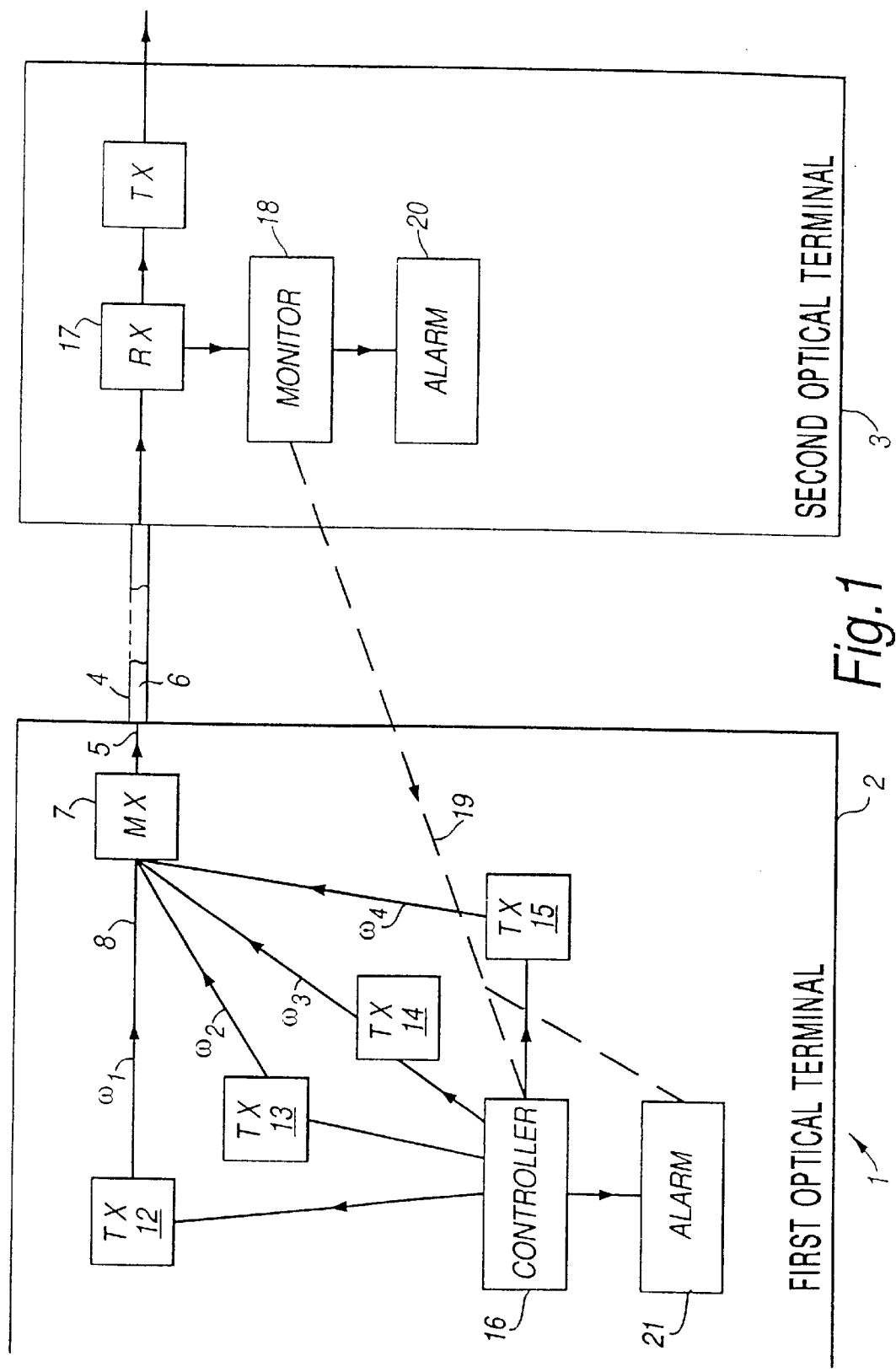
FIG. 1 is a schematic diagram of an optical transmission system in accordance with the present invention.

Alternative forms of monitor 18 are also envisaged in accordance with the present invention in its broader sense as described with reference to FIG. 1. If for example an optical signal is received by a second optical terminal 2 having a demultiplexer 25 and optical tap 27 sampling a specific frequency channel $\omega_4$ as shown for example in FIG. 3, four wave mixing product may be measured by removing the $\omega_4$ channel power transmitted by transmitter 15, the monitor 18 then being operable to measure any residual power sampled in frequency 15 channel $\omega_4$ in the received optical signal. This residual power may then be interpreted as being the sum of four wave mixing product and ASE (Amplified Spontaneous Emission). Four wave mixing product can however be readily distinguished from ASE by carry out spectral analysis on the sample since the ASE will normally have a white noise spectrum whereas the four wave mixing product will have a defined peak which can be measured to quantify the four wave mixing product. The required monitor therefore comprises a sampling circuit 27, 28, 29, 30 and processor 31 for spectral analysis, etc. Channel power switching may be implemented under appropriate algorithms programmed in the controller 16 or supervised by a network management system.

Figure 2B:
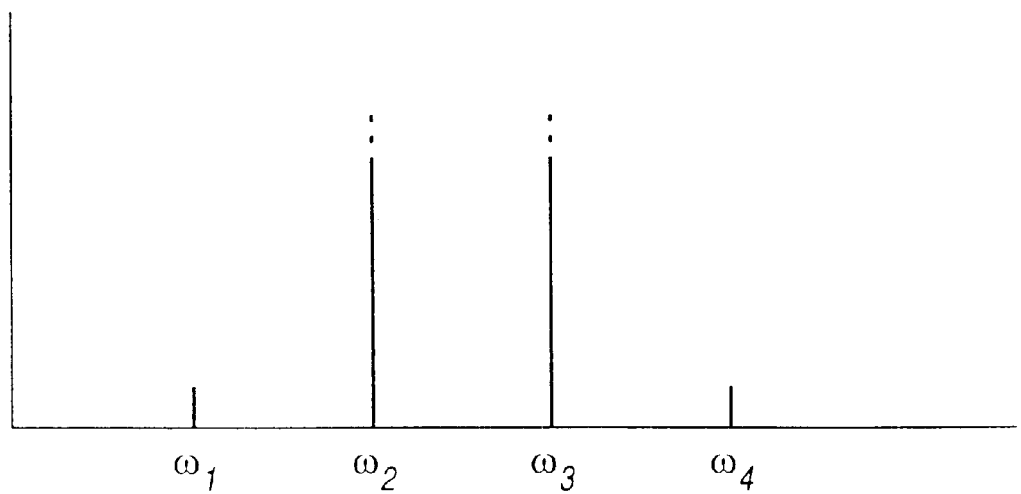

A further alternative method of monitoring four wave mixing is to measure power robbing, i.e. the effect demonstrated in FIG. 2(b) in which the peak values at $\omega_2$, $\omega_3$ are decreased by power robbing when power is transferred to frequencies $\omega_1$, $\omega_4$ as a result of four wave mixing. In the example of Equation 2 and FIG. 2(b), the received power level at $\omega_3$ can be monitored and the transmitted power at $\omega_2$ interrupted by turning off the transmitter component 13 so that the process of Equation 2 could no longer occur; if the received power at $\omega_3$ increases during the interruption, this would be indicative of power robbing and the difference in received power in channel $\omega_3$ could be quantified to provide monitored data representative of the four wave mixing product. Again, the interruption of power in selected channels may be implemented by appropriate software in controller 16 or supervised by a network management system.

Instead of interrupting the $\omega_2$ signal entirely, a temporary reduction in power at transmitter component 13 by say 3 db could alternatively be utilised.

Alternatively, the monitor 18 could be operable to receive power level data representative of the level of transmitted power at $\omega_2$ and also power level data for the received power at $\omega_2$. The monitor could then calculate from this data a measure of power loss between transmission and reception. By sequentially setting the power level of $\omega_2$ to a series of different power levels and conducting loss measurements, any variation of loss with increasing power level can be detected. Increasing loss at higher power levels would indicate the presence of a nonlinear process. The process need not necessarily however be a four wave mixing process.

Figure 5:
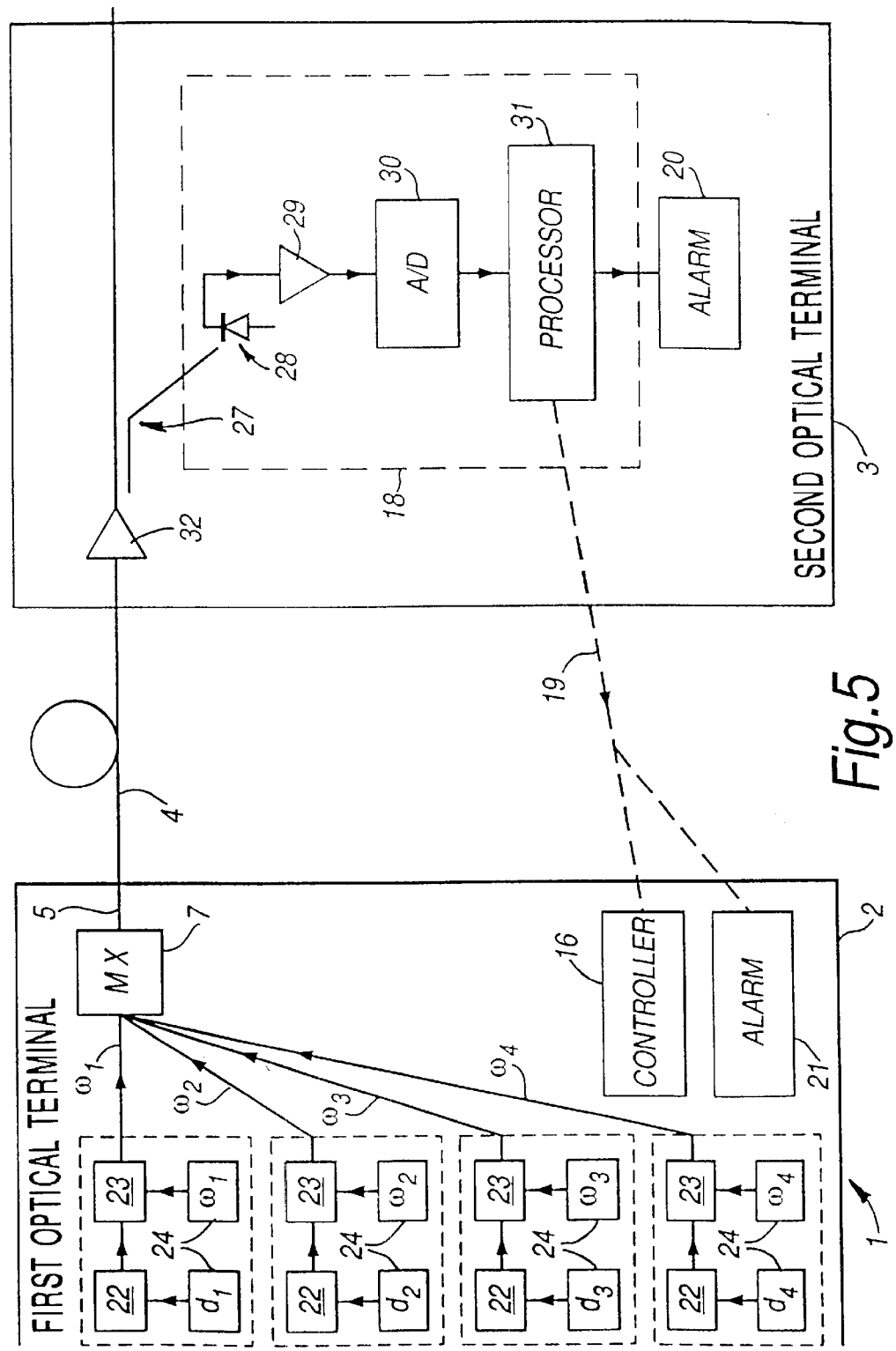
FIG. 5 is a schematic diagram of an alternative optical transmission system in which the multiplexed signal is analysed without frequency separation.

The methods described above with reference to FIGS. 3 and 4 and with reference to FIGS. 5 and 6 apply dither as a modulation superimposed upon a data carrier. The dither may alternatively be applied to specific low frequency test data patterns transmitted at intervals between data transmission, similar correlation methods being used to those described above but based upon the entire data channel to provide increased accuracy.

The monitor 18 may alternatively respond to modulation in frequency of each frequency component of the optical signal 5, thereby replacing the use of dither signals as a means of marking the individual frequency channels. Frequency modulation of channel $\omega_3$ for example would result in frequency and amplitude modulation in the four wave mixing product present in sampled channel $\omega_4$ either of which could then be detected by the monitor.

Although described above with reference to the detection of nonlinear processes in an optical waveguide 4, the monitor may be located so as to detect nonlinearity arising in other systems or devices if those systems or devices include an optical transmission medium in which nonlinear effects may occur. For example, the monitor may be located downstream of an optical amplifier such as a bi-directional optical amplifier consisting of an erbium doped fibre. The monitor may alternatively be placed downstream of an optical cross-connect or other optical switching device. Where such a device is software controlled, the monitor may utilise a processor in common with the software controller of the device.

A particular advantage of the embodiments of FIGS. 3 to 6 is that the invention may be retrofitted to existing systems by adding signal sampling components 27 to 30 and inputting the sampled data to existing processors of the system, supported by appropriate software. The present invention may therefore be implemented in many instances at minimal cost.

Communication between the processor 31 and controller 16 may be implemented in a number of manners. In general, where bi-directional communication is provided between optical terminals 2 and 3, the monitored data 19 may be communicated to the controller 16 in a return transmission. If for example OC-192 format is being utilised, the existing data communications channel may be utilised. If however, access to the data channel is not conveniently available, an optical service channel with a dedicated frequency may be utilised, for example, using 1510 nm transmission at 5 Mbits per second. The monitor 18 would in this instance be required to have a transmitting source such as a laser diode.

The present invention as described with reference to FIG. 1 has application to nonlinear processes other than four wave mixing and in particular parametric processes such as harmonic generation and parametric amplification.

What is claimed is:

1. An optical transmission system comprising:
   a plurality of optical terminals;
   optical waveguide means interconnecting the optical terminals and operable to conduct optical signals therebetween;
   at least one of the waveguide means and the optical terminals comprising an optical transmission medium susceptible to a non linear process at high power levels of the optical signal; and
   wherein at least one optical terminal comprises monitoring means operable to monitor degradation of the optical signals consistent with the non linear process occurring in the optical transmission medium and to output monitored data quantifying such degradation distinct from degradation from other causes.

2. An optical transmission system as claimed in claim 1 wherein the at least one optical terminal comprises an alarm indicating means responsive to the monitored data and operable to provide an alarm indication indicative of such degradation being detected.

3. An optical transmission system as claimed in claim 2 wherein the alarm indicating means is operable to provide the alarm indication at a remote location relative to the at least one optical terminal.

4. An optical transmission system as claimed in claim 1 comprising control means responsive to the monitored data and operable to control the power level of the optical signal.

5. An optical transmission system as claimed in claim 1 wherein the monitoring means is operable to detect products of four wave mixing.

6. An optical transmission system as claimed in claim 5 wherein the optical signals are wavelength division multiplexed with a plurality of single frequency channels separated by a substantially uniform frequency channel spacing and wherein the monitoring means is operable to detect products of four wave mixing in at least one of the single frequency channels.

7. An optical transmission system as claimed in claim 6 comprising signal modulating means operable to modulate the single frequency channels with respective high speed data streams and dither modulation means operable to modulate the single frequency channels with respective low speed, small amplitude dither signals.

8. An optical transmission system as claimed in claim 7 wherein the monitoring means comprises sampling means operable to detect an optical signal sample of the optical signal after having been transmitted through the optical transmission medium and further comprising a processor operable to perform a correlation between the optical signal sample and reference data representative of dither induced modulation in the four wave mixing product to obtain a correlation value constituting said monitored data.

9. An optical transmission system as claimed in claim 8 wherein the reference data comprises at least one spectral template derived from a predetermined pseudo-random sequence encoded in a respective dither signal.

10. An optical transmission system comprising;
a plurality of optical terminals;
optical waveguide means interconnecting the optical terminals and operable to conduct optical signals therebetween;
at least one of the waveguide means and the optical terminals comprising an optical transmission medium susceptible to a non linear process at high power levels of the optical signal; and
wherein at least one optical terminal comprises monitoring means operable to monitor degradation of the optical signals consistent with the non linear process occurring in the optical transmission medium, such degradation being substantially independent of degradation caused by at least one of amplified spontaneous emission (ASE) or insufficient signal average power; and to output monitored data quantifying such degradation.

11. An optical terminal for use in an optical transmission system for transmitting optical signals, the system comprising an optical transmission medium susceptible to a non linear process at high power levels of the optical signals, the terminal comprising;
monitoring means operable to monitor degradation of the optical signals consistent with the non linear process occurring in the optical transmission medium, and to output monitored data quantifying such degradation, substantially independent of other simultaneous degradation caused by at least one of amplified spontaneous emission (ASE) or insufficient signal average power.

12. An optical terminal for use in an optical transmission system for transmitting optical signals, the system comprising an optical transmission medium susceptible to a non linear process at high power levels of the optical signals, the terminal comprising;
monitoring means operable to monitor degradation of the optical signals consistent with the non linear process occurring in the optical transmission medium, and to output monitored data quantifying such degradation, distinct from degradation from other causes.

13. An optical transmission system comprising;
a plurality of optical terminals;
optical waveguide means interconnecting the optical terminals and operable to conduct optical signals therebetween;
at least one of the waveguide means and the optical terminals comprising an optical transmission medium susceptible to a non linear process at high power levels of the optical signal; and
wherein at least one of the optical terminal comprises a monitor operable to monitor degradation of the optical signals consistent with the non linear process occurring in the optical transmission medium, and to output monitored data quantifying such degradation distinct from simultaneous degradation from other causes.

* * * * *